United States Patent
Zhou et al.

(10) Patent No.: US 10,035,422 B2
(45) Date of Patent: Jul. 31, 2018

(54) SELF-LIMITING ACTIVE DISCHARGE CIRCUIT FOR ELECTRIC VEHICLE INVERTER

(71) Applicant: FORD GLOBAL TECHNOLOGIES, LLC, Dearborn, MI (US)

(72) Inventors: Yan Zhou, Canton, MI (US); Yuqing Tang, Northville, MI (US); Hongjie Wu, Canton, MI (US); Lihua Chen, Northville, MI (US); Shahram Zarei, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 176 days.

(21) Appl. No.: 15/181,703

(22) Filed: Jun. 14, 2016

(65) Prior Publication Data

US 2017/0355267 A1    Dec. 14, 2017

(51) Int. Cl.
| | |
|---|---|
| H02M 7/12 | (2006.01) |
| B60L 11/02 | (2006.01) |
| B60L 11/18 | (2006.01) |
| H02M 1/32 | (2007.01) |
| H02M 7/537 | (2006.01) |

(52) U.S. Cl.
CPC ............... B60L 11/02 (2013.01); B60L 11/18 (2013.01); H02M 1/32 (2013.01); H02M 7/537 (2013.01); H02M 2001/322 (2013.01)

(58) Field of Classification Search
CPC ......... B60L 11/02; B60L 11/18; H02M 7/537; H02M 1/32; H02M 2001/322
See application file for complete search history.

(56) References Cited

U.S. PATENT DOCUMENTS

| | | |
|---|---|---|
| 7,579,709 B2 | 8/2009 | Goetz et al. |
| 2013/0200692 A1 | 8/2013 | Viancino et al. |
| 2013/0234510 A1* | 9/2013 | Nakamura .............. B60L 11/00 307/10.1 |
| 2015/0034406 A1 | 2/2015 | Hirose |
| 2015/0202967 A1 | 7/2015 | Syed et al. |

FOREIGN PATENT DOCUMENTS

CN            104393586 A        3/2015

* cited by examiner

*Primary Examiner* — Jared Fureman
*Assistant Examiner* — Joel Barnett
(74) *Attorney, Agent, or Firm* — David B. Kelley; MacMillan, Sobanski & Todd, LLC

(57) ABSTRACT

A DC link capacitor coupled to positive and negative DC busses between a high voltage DC source and an electric vehicle inverter is quickly discharged during a shutdown. An active discharge circuit connected across the link capacitor has a discharge resistor in series with a discharge switch. The discharge switch has a control terminal for selectably turning the discharge switch on and off. A disable circuit is coupled to the control terminal and is responsive to a disable command signal to turn off the discharge switch. The disable circuit turns on the discharge switch upon cessation of the disable command signal. A timing circuit powered by a voltage from the link capacitor initiates a predetermined time interval upon cessation of the disable command signal, and continuously turns off the discharge switch after the predetermined time interval while the voltage from the link capacitor remains above a threshold.

1 Claim, 4 Drawing Sheets

SELF-LIMITING ACTIVE DISCHARGE CIRCUIT FOR ELECTRIC VEHICLE INVERTER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to drive systems for electric vehicles, and, more specifically, to the rapid discharging of capacitors when shutting down the electric drive system.

Electric vehicles, such as hybrid electric vehicles (HEVs) and plug-in hybrid electric vehicles (PHEVs), use inverter-driven electric machines to provide traction torque and regenerative braking torque. The inverters typically employ a relatively large energy storage capacitor as a main DC link to maintain a desired bus voltage and absorb switching related ripples. The DC link capacitor is usually interfaced with a high-voltage (HV) battery through a pair of mechanical contactors (e.g., relays).

A shutdown of the electric drive system can result from a vehicle key-off, a high-voltage DC interlock fault, or a vehicle crash, for example. During shutdown, the HV battery is quickly isolated from the rest of the electric system by opening the mechanical contractors. However, there will still be HV electric charge on the DC link capacitor. Due to safety requirements, the HV electric charge should be quickly discharged within a specific time.

The simplest conventional methods for discharging the link capacitor dissipate the charge through a resistance placed across the capacitor. The resistor placement can be passive or active. A passive discharge resistor (PDR), which is hard-wired in parallel with the link capacitor, must have a relatively large resistance to avoid excessive power loss during normal operation. Consequently, it may take one to two minutes to dissipate an HV charge down to a safe level.

In some situations (such as a crash), it may be desirable or required to discharge the capacitor in a much shorter time (e.g., 5 seconds). Therefore, an active discharge resistor (ADR) controlled by a transistor switch may be used so that the charge can be dissipated through a smaller resistance value.

In order to ensure automatic discharge of the link capacitor in the event of a failure of an electronic control unit, the ADR switching device is typically connected to the power bus in a manner that would normally turn it on, and a disable circuit is connected between the control unit and the ADR switching device. The disable circuit keeps the ADR switching device turned off as long as a disable command signal from the control unit is received. If the disable command ceases (either intentionally or as a result of failure of the control unit), the ADR switching device turns on to discharge the link capacitor.

When the disable command signal to the ADR is removed, the electric drive can be in any of several possible states. For example, there may or may not be a source of voltage continuing to charge the capacitor. A voltage could still be supplied to the capacitor even though a shutdown has been attempted if 1) the contactor relays have failed to open and the battery remains connected to the link capacitor, or 2) the vehicle is moving and a back electromotive force (BEMF) from a spinning motor is coupled to the link capacitor. Under these conditions, the ADR dissipates not only the original charge held in the link capacitor but also an ongoing current supported by the continued supply of voltage. Consequently, the prior art ADR circuit has required component power capacities and heat ratings for continuous operation in order survive a worst case scenario. Furthermore, a liquid cooled heat sink to dissipate the continuous heat generated in the ADR resistor may also be needed, which further increases the cost of the circuit.

SUMMARY OF THE INVENTION

In one aspect of the invention, a drive system for an electric vehicle comprises a DC link capacitor adapted to be coupled to positive and negative DC busses between a DC power source and an inverter. An active discharge circuit is connected across the link capacitor comprising a discharge resistor in series with a discharge switch. The discharge switch has a control terminal for selectably turning the discharge switch on and off. A disable circuit is coupled to the control terminal and is responsive to a disable command signal to turn off the discharge switch. The disable circuit turns on the discharge switch upon cessation of the disable command signal. A timing circuit powered by a voltage from the link capacitor is configured to 1) initiate a predetermined time interval upon cessation of the disable command signal, and 2) continuously turn off the discharge switch after the predetermined time interval while the voltage from the link capacitor remains above a threshold.

DETAILED DESCRIPTION OF PREFERRED EMBODIMENTS

Figure 1:
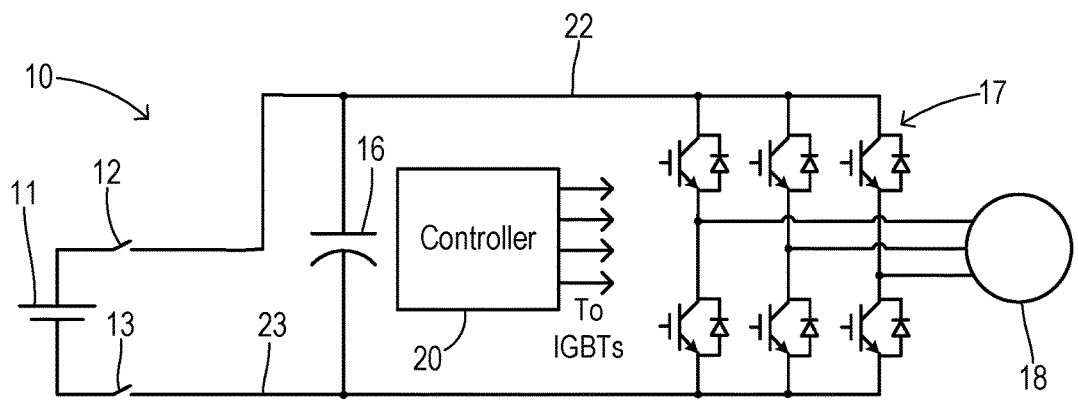
FIG. 1 is a schematic diagram showing one typical embodiment of an electric vehicle drive having a DC link capacitor.

Referring to FIG. 1, an electric vehicle drive system 10 includes a DC power source 11 (such as a battery pack or a fuel cell) coupled to contactor switches 12 and 13. Contactors 12 and 13 are preferably mechanical switches having an open state and a closed state for selectively coupling battery 11 to a positive bus 22 and a negative bus 23 of electric drive system 10.

A main capacitor (i.e., DC link) 16 functions as a linking capacitor for an inverter 17. Inverter 17 includes a plurality of switching devices in a bridge configuration. The switches in inverter 17 are switched in a desired manner to drive a motor 18.

Each of the switching devices in inverter 17 is preferably comprised of an insulated-gate bipolar transistor (IGBT) or other power semiconductor switching device. Each IGBT includes a reverse-blocking diode. Each IGBT has a respective control (e.g., base) terminal coupled to a controller 20 which controls (i.e., drives) the switches according to various operating modes of the inverters.

Controller 20 may be a motor-generator control unit (MGCU), which is commercially available as a programmable device. In addition to handling pulse width modulation (PWM) control of the inverters, MGCU controller 20 can also control a discharge circuit of link capacitor 16 via a discharge command signal as described below.

Figure 2:
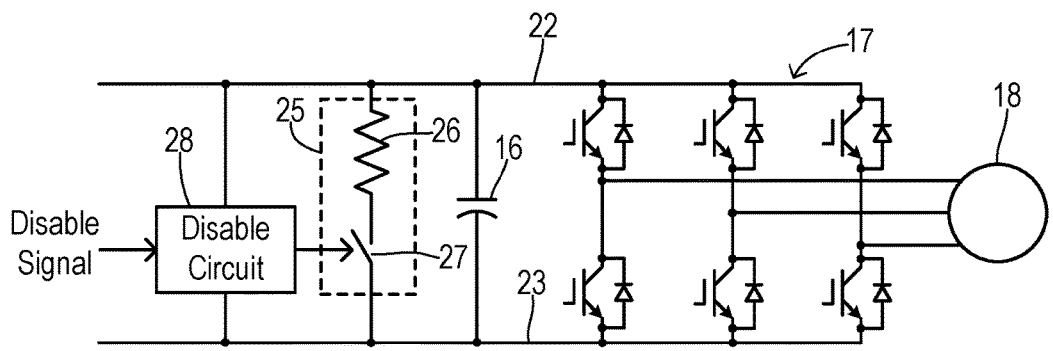
FIG. 2 is a schematic diagram showing a prior art active discharge resistor for discharging the DC link capacitor.

FIG. 2 shows a conventional active discharge circuit 25 connected across link capacitor 16 (e.g., between positive DC bus 22 and negative DC bus 23). Discharge circuit 25 comprises a discharge resistor 25 in series with a discharge switch 27. Switch 27 has a control terminal for selectably turning the discharge switch on and off via a disable circuit 28 in response to a disable command signal from the MGCU. The function of disable circuit 28 is to perform a logical inversion of the disable command signal. Thus, when the disable command signal has a high logic level, an output of disable circuit 28 connected to the control terminal has a low voltage level so that switch 27 is turned off (and capacitor 16 is not discharged). The low voltage level can be obtained by shunting the control terminal to negative bus 23, for example. When the disable command signal ceases (i.e., drops to a low logic level), the output of disable circuit 28 is automatically pulled up to a voltage sufficient to turn on discharge switch 27 and capacitor 16 is quickly discharged unless a condition exists in which a voltage continues to be applied across busses 22 and 23.

An ongoing voltage can result from a back EMF of the motor passing through the reverse diodes in the inverter bridge or a failure of the contactors to disconnect the battery pack. In case such a situation occurs, discharge resistor 26 may be required to carry a significant current on a continuous basis. Therefore, the prior art has required a relatively large power and high temperature rating for the discharge resistor and/or a significant heat sinking capability, which results in added costs and space requirements.

Figure 3:
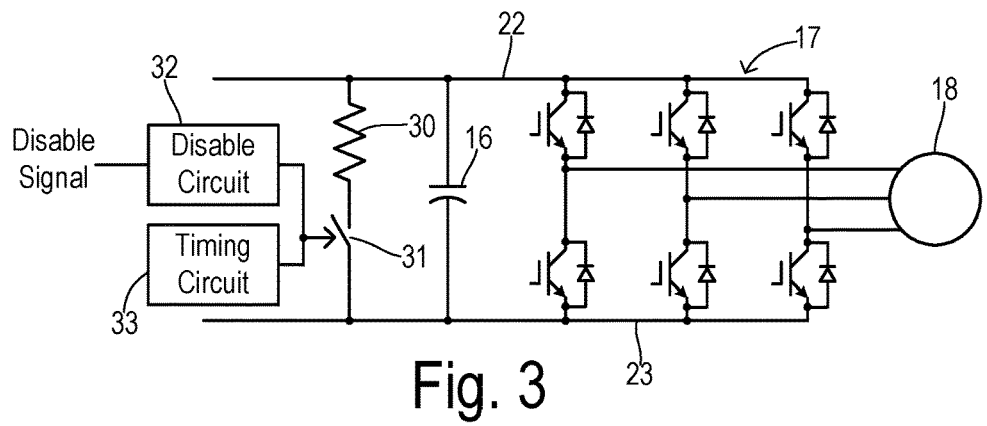
FIG. 3 is a schematic diagram showing a timing circuit of the present invention.

The present invention reduces the heat dissipation requirements for the discharge resistor by automatically eliminating discharge resistor operation in the situation when an ongoing voltage is being impressed on the link capacitor. As shown in FIG. 3, an extra timing circuit is added for limiting the operation time of an active discharge circuit to fixed, short duration. The fixed short duration is selected to be just long enough to discharge the main link capacitor's stored energy under normal conditions. The timing circuit is powered by the main link capacitor's voltage so that it is able to maintain a disabled condition of the discharge switch for as long as a voltage source continues to energize the capacitor. The benefit of the added timing circuit is to decrease the power rating requirement of the ADR and reduce its cooling requirement.

Referring to FIG. 3, an active discharge circuit for link capacitor 16 comprises a discharge resistor 30 in series with a discharge switch 31, wherein the discharge switch. A control terminal of discharge switch 31 is used to selectably turning discharge switch 31 on and off under control of a disable circuit 32 and a timing circuit 33 which are coupled to the control terminal. Disable circuit 32 is responsive to a disable command signal from a controller (e.g. MGCU) to turn off discharge switch 31. Upon cessation of the disable command signal, disable circuit 32 turns on discharge switch 31 so that capacitor 16 may be discharged.

Timing circuit 33 is powered by a voltage from link capacitor 16. When the disable command signal ceases, timing circuit 33 initiates a predetermined time interval (i.e., the short, fixed time that is just long enough to discharge link capacitor 16 under normal conditions). The time interval or delay can be implemented using digital techniques (e.g., a counter) or analog techniques (e.g., voltage rise of an RC network). When the time interval expires, timing circuit 33 continuously turns off discharge switch 31. Timing circuit 33 may remain in this turn-off state for as long as the voltage on link capacitor 16 remains above a threshold (e.g., a turn-on threshold of a latching transistor in timing circuit 33 as discussed below) or until a disable command signal is re-initiated by the MGCU.

Figure 4:
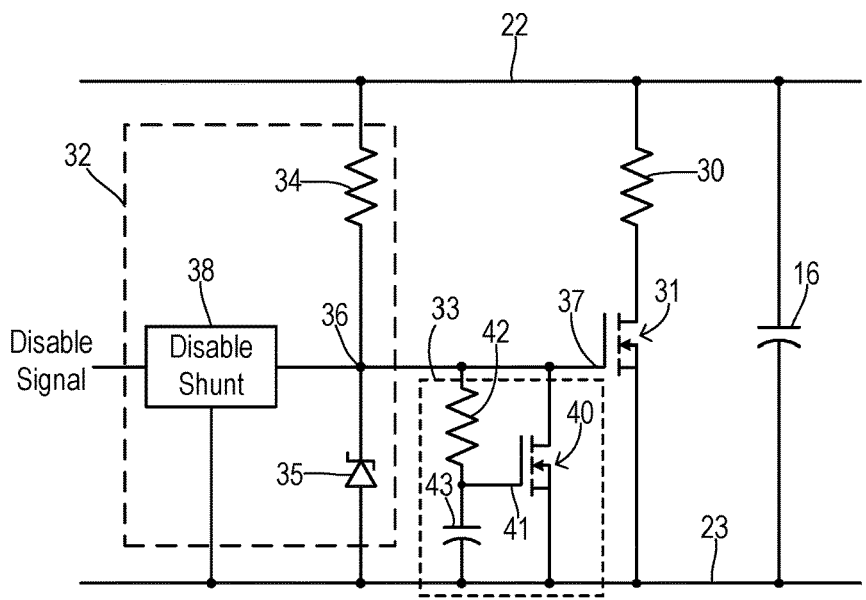
FIG. 4 is a schematic diagram showing one embodiment of a timing circuit of the invention in greater detail.

One preferred embodiment of the invention is shown in greater detail in FIG. 4. Disable circuit 32 has a pull-up resistor 34 connected in series with a Zener diode 35 between positive bus 22 and negative bus 23. A junction 36 between pull-up resistor 34 and diode 35 is connected to a gate terminal 37 of discharge switch 31 which is preferably comprised of an enhancement-mode MOSFET. Disable circuit 32 includes a disable shunt 38 receiving the disable command signal for selectively shunting junction 36 with negative bus 23. When disable shunt 38 is active as a result of the presence of the disable command signal, junction 36 and gate terminal 37 of MOSFET 31 are held at a low voltage (close to negative bus 23) so that discharge MOSFET 31 is turned off. When the disable command ceases and disable shunt 38 switches to an open state then junction 36 is no longer shunted to negative bus 23. Consequently, current begins to flow through resistor pull-up resistor 34 and the voltage at junction 36 quickly rises until it reaches the characteristic breakdown voltage of Zener diode 35. The breakdown voltage is sufficiently high to turn on MOSFET 31 to initiate discharging the capacitor 16 (i.e., the Zener breakdown voltage is greater than the turn-on threshold of the MOSFET).

Timing circuit 33 also receives the increased voltage at junction 36 (i.e., circuit 33 is powered by the voltage from capacitor 16). Timing circuit 33 has a MOSFET 40 which acts as a latch switch coupled between gate terminal 37 of discharge MOSFET 31 and negative bus 23. A gate terminal 41 of latch MOSFET 40 is connected to a junction between a resistor 42 and a capacitor 43 which are connected between junction 36 and negative bus 23. Resistor 42 and capacitor 43 form an RC timing network together with pull up resistor 34. According to an RC time constant of the RC network, a voltage across capacitor 43 gradually rises until reaching a turn-on threshold of MOSFET 40 (assuming power from capacitor 16 remains available long enough).

Figure 5A:
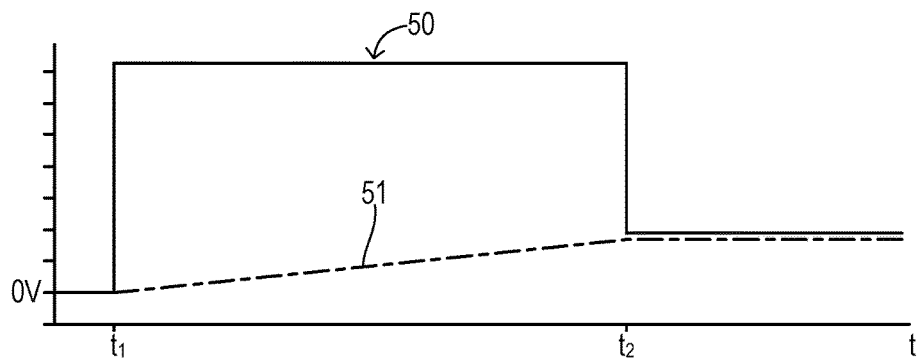
FIGS. 5A and 5B are waveform plots showing the action of the active discharge circuit of the invention when the DC link capacitor receives an ongoing supply of voltage.
Figure 5B:
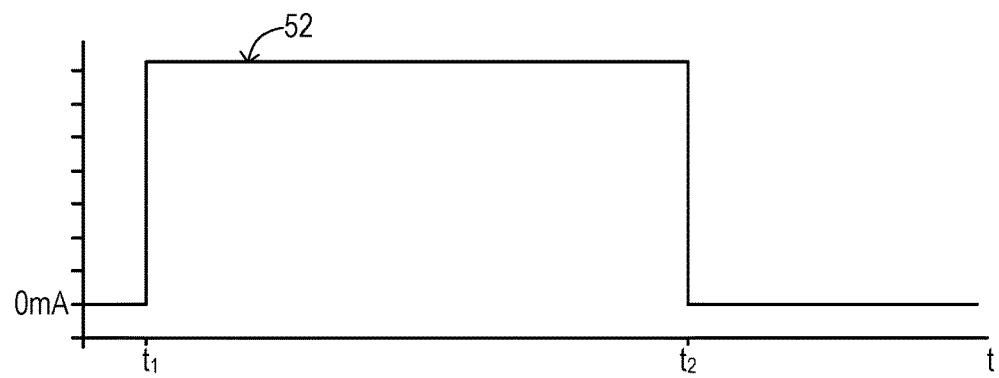

FIGS. 5A and 5B illustrate operation of the invention of FIG. 4 when a main capacitor discharge attempt is initiated by ceasing (i.e., turning off) the disable command signal at a time when the discharge will not actually occur because the capacitor continues to be connected to the battery or supported by a back EMF from the motor. As shown in FIG. 5A, a trace 50 represents a voltage at the gate control terminal of the discharge switch (e.g., the voltage at junction 36 in FIG. 4). Prior to a time $t_1$, the gate voltage fixed at substantially zero volts due to activation of the disable shunt. At time $t_1$, the disable command signal ceases and the gate voltage quickly rises to a higher voltage. The magnitude of the gate voltage is determined by the breakdown voltage of the Zener diode which may be around 15V, for example. As a result, the discharge switch turns on at time $t_1$. As shown in FIG. 5B, a current trace 52 likewise transitions to a positive value at time $t_1$. In this case, no capacitor discharging occurs because of a continued supply of voltage to the capacitor. Therefore, the current through the discharge circuit in FIG. 5 remains at about the same level after time $t_1$. Immediately after time $t_1$, MOSFET 40 is in its cutoff region and operation of the discharge circuit is unaffected by the timing circuit.

FIG. 5A shows a trace 51 corresponding to a gate voltage of latch MOSFET 40 in timing circuit 33. Trace 51 indicates a gradually increasing voltage on the capacitor in the RC network which eventually reaches a turn-on threshold for the latch MOSFET at a time $t_2$ (i.e., after a predetermined time interval which is determined by the characteristics of resistors 42 and 34 and capacitor 43). At time $t_2$, a steady state condition is achieved in timing circuit 33 wherein the turning on of latch MOSFET 40 pulls the voltage at junction 36 below the breakdown voltage of Zener diode 35. In this steady-state, MOSFET 40 is turned fully on, resulting in the gate voltages of MOSFET 40 and MOSFET 31 to be substantially the same. MOSFETs 40 and 31 are selected such that they have different turn-on thresholds, wherein the turn-on threshold voltage for MOSFET 31 is higher than the turn-on threshold voltage for MOSFET 40. Consequently, when the steady-state is reached with MOSFET 40 remaining on, MOSFET 31 turns off. Thus, current through discharge resistor 30 drops to zero at time $t_2$ as shown in FIG. 5B.

Figure 6A:
FIGS. 6A and 6B are waveform plots showing the successful discharging action of the active discharge circuit of the invention when the DC link capacitor does not receive an ongoing supply of voltage.
Figure 6B:
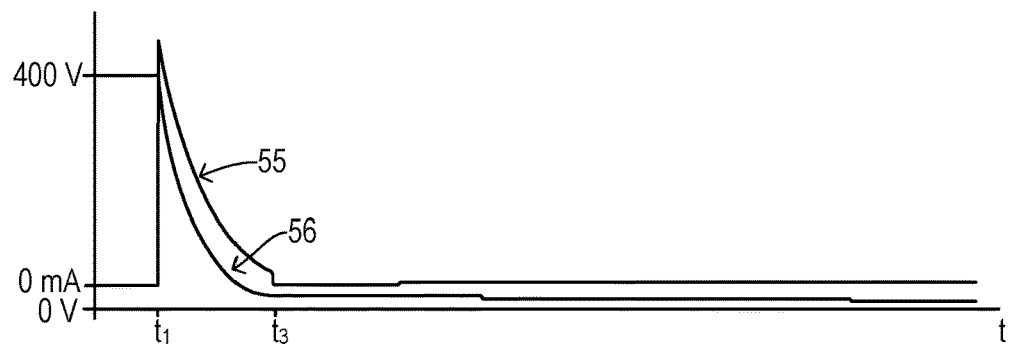

FIGS. 5A and 5B illustrate operation of the invention of FIG. 4 when a main capacitor discharge attempt is initiated by ceasing (i.e., turning off) the disable command signal at a time when no ongoing voltage is supplied to the main capacitor and discharging can proceed normally. As shown in FIG. 6A, a trace 53 represents a voltage at the gate control terminal of the discharge switch (e.g., the voltage at junction 36 in FIG. 4). Prior to a time $t_1$, the gate voltage fixed at substantially zero volts due to activation of the disable shunt. At time $t_1$, the disable command signal ceases and the gate voltage quickly rises to the Zener voltage. As a result, the discharge switch again turns on at time $t_1$. As shown in FIG. 6B, a current trace 55 likewise transitions to a positive value at time $t_1$. After a rapid rise, current trace 55 begins to decay as the main linking capacitor discharges. The decaying voltage on link capacitor 16 is shown by a trace 56 in FIG. 6B.

The main capacitor discharging results in a corresponding decay of the gate voltage of discharge MOSFET 31 shown by trace 53 in FIG. 6A. Charging of the RC network of timing circuit 33 results in a gradual rise in the gate voltage of latch MOSFET 41 as shown by trace 54. However, the reduction of the main capacitor voltage charging the timing capacitor in the RC network results in gate voltage trace 54 failing to reach the turn-on threshold of latch MOSFET 40. A steady state is reached at a time $t_3$, wherein both MOSFETs are turned off and only a small voltage persists temporarily on main link capacitor 16. Thus, timing circuit 33 has no significant effect on the normal discharging operation.

Figure 7:
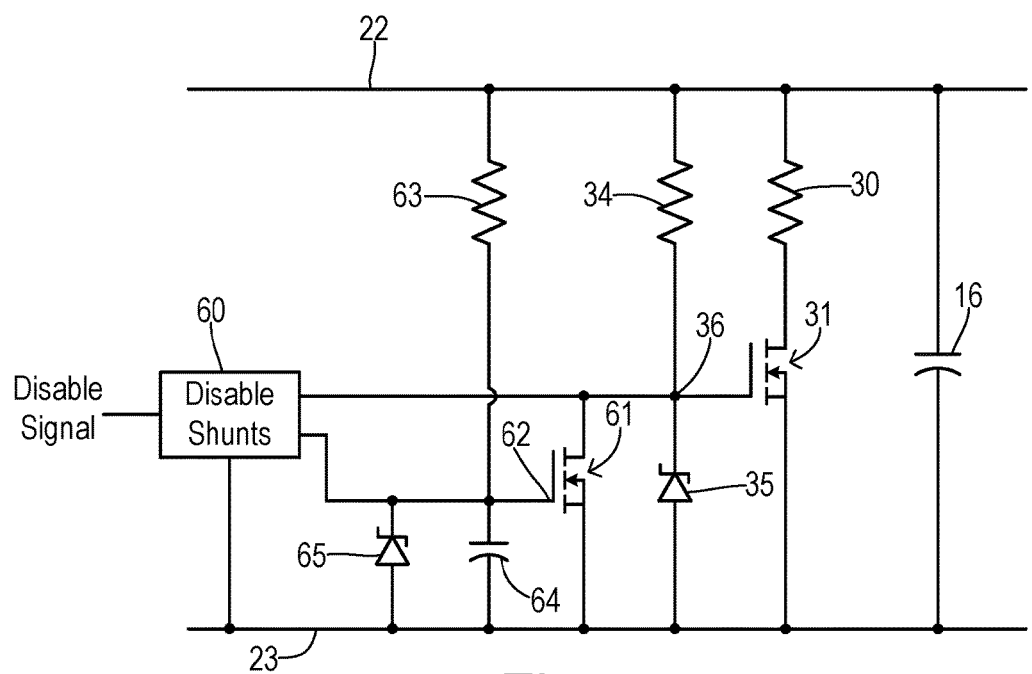
FIG. 7 is a schematic diagram showing another embodiment of a timing circuit of the invention in greater detail.

FIG. 7 shows an alternative embodiment of the invention wherein the timing interval is controlled independently of the components in the discharge circuit and wherein the turn-on thresholds of the MOSFETs are not required to satisfy any particular relationship. In FIG. 7, a disable circuit formed by pullup resistor 34 and Zener diode 35 functions as previously described. In this case, the disable shunt is provided by one-half of a dual disable shunt 60. Disable shunt 60 provides a distinct shunt (i.e., path to negative bus 23) for a timing circuit comprising an independent RC network with a resistor 63 and capacitor 64 connected between busses 22 and 23. A latch MOSFET 61 has an output (i.e., drain and source terminals) connected between the gate control terminal of discharge MOSFET 31 and negative bus 23. A gate control terminal 62 of latch MOSFET 61 is connected to the junction between resistor 63 and capacitor 64. A Zener diode 65 is coupled between gate terminal 62 and negative bus 23 to protect MOSFET 61.

A predetermined time interval $t_2$ of the timing circuit in FIG. 7 depends only on resistor 63 and capacitor 64 (together with the threshold voltage of MOSFET 61) and is independent of pullup resistor 34. When the voltage appearing on capacitor 64 reaches the turn-on threshold of latch MOSFET 61, then MOSFET 61 turns on. As a result, the gate voltage for discharge MOSFET 31 drops to a low potential and turns off MOSFET 31. Therefore, an ongoing voltage that persists across busses 22 and 23 results in a shutdown of the active discharging function.

In view of the foregoing invention, a timing circuit is shown which limits the active discharge circuit operation to a fixed, short time period which significantly reduces active discharge resistor power rating requirements and cooling requirements. The cost of added circuitry is less than the cost savings achieved by downsizing the discharge resistor and eliminating or reducing cooling components.

What is claimed is:

1. A drive system for an electric vehicle, comprising:
   a DC link capacitor adapted to be coupled to positive and negative DC busses between a DC power source and an inverter;
   an active discharge circuit connected across the link capacitor comprising a discharge resistor in series with a discharge switch, wherein the discharge switch has a control terminal for selectably turning the discharge switch on and off;
   a disable circuit coupled to the control terminal and responsive to a disable command signal to turn off the discharge switch, wherein the disable circuit turns on the discharge switch upon cessation of the disable command signal, wherein the disable circuit comprises i) a pullup resistor in series with a Zener diode between the busses and having a junction between the pullup resistor and the Zener diode connected to the control terminal of the discharge switch and ii) a disable shunt coupling the control terminal of the discharge switch to the negative bus in response to the disable command signal; and
   a timing circuit powered by a voltage from the link capacitor and configured to 1) initiate a predetermined time interval upon cessation of the disable command signal, and 2) continuously turn off the discharge switch after the predetermined time interval while the voltage from the link capacitor remains above a threshold, wherein the timing circuit comprises i) a latch switch between the control terminal of the discharge switch and the negative bus and ii) an RC network for turning on the latch switch after the predetermined time interval comprising a resistor connected between a control terminal of the latch switch and the control terminal of the discharge switch and a capacitor coupled between the control terminal of the latch switch and the negative bus;
   wherein the discharge switch and the latch switch are each comprised of a respective field effect transistor (FET), wherein the FET for the discharge switch has a threshold voltage which is higher than a threshold voltage of the FET for the latch switch to provide a steady state condition wherein the discharge switch is continuously turned off and the latch switch is continuously turned on after the predetermined time interval if a voltage across the link capacitor remains above a threshold voltage.

* * * * *